United States Patent
Barri et al.

(10) Patent No.: US 7,522,624 B2
(45) Date of Patent: Apr. 21, 2009

(54) SCALABLE AND QOS AWARE FLOW CONTROL

(75) Inventors: Peter Irma August Barri, Bonheiden (BE); Bart Joseph Gerard Pauwels, Tessenderlo (BE); Geert René Taildemand, Oosterzele (BE)

(73) Assignee: Alcatel, Paris (FR)

( * ) Notice: Subject to any disclaimer, the term of this patent is extended or adjusted under 35 U.S.C. 154(b) by 630 days.

(21) Appl. No.: 10/965,844

(22) Filed: Oct. 18, 2004

(65) Prior Publication Data

US 2005/0083920 A1    Apr. 21, 2005

(30) Foreign Application Priority Data

Oct. 21, 2003   (EP)   .................... 03292613

(51) Int. Cl.
    H04L 12/28   (2006.01)
(52) U.S. Cl. .................. 370/413; 370/359; 370/398; 370/422; 370/396
(58) Field of Classification Search ......... 370/232–235, 370/412, 413, 387, 388, 396, 398
    See application file for complete search history.

(56) References Cited

U.S. PATENT DOCUMENTS

| | | | | |
|---|---|---|---|---|
| 5,724,351 A * | 3/1998 | Chao et al. | ............. | 370/395.42 |
| 5,982,776 A * | 11/1999 | Manning et al. | ............. | 370/414 |
| 6,072,772 A * | 6/2000 | Charny et al. | ............. | 370/229 |
| 6,118,792 A * | 9/2000 | Beshai | ............. | 370/468 |
| 6,134,217 A * | 10/2000 | Stiliadis et al. | ............. | 370/232 |
| 6,324,164 B1 * | 11/2001 | Luijten et al. | ............. | 370/230 |
| 6,324,165 B1 * | 11/2001 | Fan et al. | ............. | 370/232 |
| 6,359,861 B1 * | 3/2002 | Sui et al. | ............. | 370/230 |
| 6,408,005 B1 * | 6/2002 | Fan et al. | ............. | 370/412 |
| 6,810,031 B1 * | 10/2004 | Hegde et al. | ............. | 370/351 |
| 6,876,629 B2 * | 4/2005 | Beshai et al. | ............. | 370/232 |
| 6,882,655 B1 * | 4/2005 | Isoyama et al. | ............. | 370/415 |
| 6,967,924 B1 * | 11/2005 | Aimoto | ............. | 370/235 |
| 7,020,161 B1 * | 3/2006 | Eberle et al. | ............. | 370/468 |
| 7,068,602 B2 * | 6/2006 | Davari et al. | ............. | 370/232 |
| 7,158,512 B1 * | 1/2007 | Kamhine | ............. | 370/389 |
| 7,177,309 B2 * | 2/2007 | Shinohara | ............. | 370/389 |
| 7,180,862 B2 * | 2/2007 | Peebles et al. | ............. | 370/235 |
| 7,346,068 B1 * | 3/2008 | Dan et al. | ............. | 370/413 |
| 2001/0021176 A1 * | 9/2001 | Mimura et al. | ............. | 370/235 |
| 2002/0181483 A1 * | 12/2002 | Oki et al. | ............. | 370/413 |
| 2003/0103450 A1 | 6/2003 | Chapman et al. | | |
| 2003/0123455 A1 * | 7/2003 | Zhao et al. | ............. | 370/398 |
| 2003/0227932 A1 * | 12/2003 | Meempat et al. | ............. | 370/415 |
| 2004/0071145 A1 * | 4/2004 | Ha et al. | ............. | 370/395.43 |

FOREIGN PATENT DOCUMENTS

EP    1 195 953 A1    4/2002

* cited by examiner

*Primary Examiner*—Ricky Ngo
*Assistant Examiner*—Dewanda Samuel
(74) *Attorney, Agent, or Firm*—Sughrue Mion, PLLC

(57) ABSTRACT

The present invention relates to a switching unit with a scalable and QoS aware flow control. The actual schedule rate of an egress queue, wherein the outgoing traffic belonging to a particular class of service is backlogged, is measured and compared to its expected schedule rate. If the egress queue is scheduled below expectation, then the bandwidth of every virtual ingress-to-egress pipe connecting an ingress queue, wherein the incoming traffic belonging to the same class of service is backlogged before transmission through the switch core fabric, to that egress queue is increased, thereby feeding that egress queue with more data units.

6 Claims, 3 Drawing Sheets

SCALABLE AND QOS AWARE FLOW CONTROL

CROSS-REFRENCE TO RELATED PATENT APPLICATION

This application claims priority from the European patent application EP 03292613.1 filed Oct. 21, 2003.

BACKGROUND OF THE INVENTION

The present invention relates to a switching unit comprising:
- a switch core fabric,
- an output termination module coupled to said switch core fabric,
- an input termination module coupled to said switch core fabric, said output termination module comprising:
- an egress queue adapted to backlog data units belonging to a class of service,
- an egress scheduler coupled to said egress queue, and adapted to schedule data units from said egress queue towards an output termination port, said input termination module comprising:
- an ingress queue adapted to backlog data units belonging to said class of service and bound to said output termination module, said switching unit further comprising, as forming part of said input termination module, of said switch core fabric and of said output termination module, at least point-to-point transmission means adapted to convey data units from at least said ingress queue to at least said egress queue, said at least point-to-point transmission means being considered, with respect to said ingress queue and to said egress queue, as a virtual ingress-to-egress pipe connecting said ingress queue to said egress queue.

To operate a switching unit efficiently, and to support controlled Quality of Service (QoS) differentiation in a bursty, unpredictable traffic pattern environment, the switching unit has to be complemented with a flow control mechanism. The granularity of the individual amounts of user traffic for which a flow control decision has to be made, the number of destinations and Classes of Service (CoS) to be distinguished, and the state of technology that can be used to implement the flow control, determine the rate and precision of the flow control decisions, and whether this flow control can be realized in a centralized or distributed manner. As the switching unit size and the applied flow granularity grow, either higher processing and communication speed, or more calculation and communication resources are required.

Credit based flow control grants every potential source of traffic in the switching unit a given limited amount of traffic it can allow into the fabric. The source can use the obtained credit at its own discretion. The credit is renewed on demand or on a regular basis. The calculation rule for granting the credit has to be fair over time to avoid giving an unjustified advantage to a particular physical path across the switching unit.

Internal Dynamic Rate-based Flow Control (IDRFC) is a credit based flow control, involving bandwidth negotiation between each and every input and output termination module within a fixed time schedule (IDRFC cycles).

The cited document discloses a switching unit that implements a weighted IDRFC algorithm for sharing an internal excess bandwidth among the input termination modules, according to bandwidth requests from the input termination modules. The bandwidth request and grant related to an input termination module linked by a virtual ingress-to-egress pipe to an output termination module are both calculated for a determined number of relative administrative weights corresponding each to a different CoS, with a different request and a corresponding grant for every weight.

The processing power required for calculating bandwidth requests and grants scales linearly with the number of CoS. The scalability of a switching unit implementing such a flow control is thus limited.

SUMMARY OF THE INVENTION

It is an object of the present invention to provide a switching unit with a scalable and QoS aware flow control.

According to the invention, this object is achieved due to the fact that said output termination module further comprises a measurement means coupled to said egress scheduler, and adapted to determine whether said egress queue is scheduled below expectation during a first pre-determined period of time, and that said switching unit further comprises a flow controller coupled to said measurement means, and adapted, if said egress queue is scheduled below expectation during said first pre-determined period of time, to increase bandwidth of said virtual ingress-to-egress pipe during a second pre-determined period of time subsequent to said first pre-determined period of time.

In a preliminary step, a fair amount of the total available bandwidth is granted to every virtual ingress-to-egress pipe connecting an ingress queue of an input termination module to an egress queue of an output termination module, in relation with an expected traffic situation at the ingress side.

The bandwidth of a virtual ingress-to-egress pipe is defined as the number of data units that virtual ingress-to-egress pipe can convey per unit of time.

An egress scheduler of an output termination module schedules data units from an egress queue towards an output termination port in proportion to a service share allotted to that egress queue, and a service rate allotted to that egress scheduler. The service rate and the service share are allotted in such a way that the aggregate bandwidth of all the virtual ingress-to-egress pipes bound to that egress queue is drained off.

Data units may experience bottlenecks on the way towards the output termination modules. If so, some egress schedulers might be left out of data units to schedule from some egress queues.

Therefore, the actual schedule rate of an egress queue is compared to the expected schedule rate of that egress queue, as derived from the service share of that egress queue, from the service rate of the scheduler and from the scheduling algorithm. If the actual schedule rate is lower than the expected schedule rate, that is to say if the egress queue is scheduled below expectation, then the bandwidth of every virtual ingress-to-egress pipe bound to that egress queue is increased, thereby feeding that egress queue with more data units.

Ways an egress queue is determined as being scheduled below expectation are manifold, in close relation with the method used for measuring the actual schedule rate, and with the mathematical criteria used for comparing the actual and expected schedule rates.

The period of time over which the actual schedule rate is measured and the period of time during which bandwidth is increased are relatively short periods of time subsequent to one another, not necessarily contiguous. These periods of time might or might not correspond to IDRFC cycles.

A non limiting example of a data unit is an Internet Protocol (IP) datagram conveyed over an IP-based network, such as the Internet.

Another non limiting example of a data unit is a Multi-Path Label Switched (MPLS) packet conveyed over an MPLS-based network, such as a backbone network.

Another non limiting example of a data unit is an Asynchronous Transfer Mode (ATM) cell conveyed over an ATM-based network, such as a broadband public network.

A non limiting example of a switching unit is a IP router adapted to route IP datagrams to the right destination with differentiated service classes (diffserv).

Another non limiting example of a switching unit is a Label Switched Router (LSR) adapted to forward MPLS packets to the right destination with differentiated forwarding treatments.

Another non limiting example of a switching unit is an ATM broadband switch adapted to switch ATM cells to the right destination with a guaranteed QoS.

A non limiting example of at least point-to-point transmission means is a switch core fabric made of modular switching elements, with each a small internal buffer memory, in association with means in every input termination module for aggregating data units towards the switch core fabric, and means in every output termination module for de-multiplexing data units towards the appropriate egress queues.

Ways to increase the bandwidth of a virtual ingress-to-egress pipe are manifold, in close relation with the underlying hardware and/or software implementing the at least point-to-point transmission means.

In one embodiment of the present invention, said input termination module further comprises, as forming part of said virtual ingress-to-egress pipe, an ingress scheduler adapted to schedule said incoming data units from said ingress queue towards said switch core fabric in proportion to a service share allotted to said ingress queue, and said flow controller comprises an ingress scheduler controller coupled to said measurement means and to said ingress scheduler, and adapted, if said egress queue is scheduled below expectation during said first pre-determined period of time, to allot an higher service share to said ingress queue during said second pre-determined period of time.

By increasing the service share of an ingress queue, more data units from that ingress queue flow through the scheduler and reach the egress queue. The internal bandwidth being upper bound, this increase might be at the expense of other ingress queues aggregated through the same scheduler, the service share of which is decreased at a relative extent.

Bandwidth of a virtual ingress-to-egress pipe can be increased further on the way towards the output termination modules.

In an alternative embodiment of the present invention, said flow controller comprises a bandwidth distribution means coupled to said measurement means, and adapted:

to assign said virtual ingress-to-egress pipe to either a first group of virtual ingress-to-egress pipes or a second group of virtual ingress-to-egress pipes, depending on whether said egress queue is scheduled below expectation during said first pre-determined period of time, each of said first group of virtual ingress-to-egress pipes connecting an ingress queue of said input termination module to an egress queue of said output termination module scheduled below expectation during said first pre-determined period of time, each of said second group of virtual ingress-to-egress pipes connecting an ingress queue of said input termination module to an egress queue of said output termination module scheduled at or above expectation during said first pre-determined period of time, to distribute to said first group of virtual ingress-to-egress pipes, respectively to said second group of virtual ingress-to-egress pipes, a first amount, respectively a second amount, of a total bandwidth available through said at least point-to-point transmission means, said total bandwidth being distributed with precedence to said first group of virtual ingress-to-egress pipes.

The virtual ingress-to-egress pipes connecting ingress queues of an input termination module to egress queues of an output termination module are sorted into 2 groups: virtual ingress-to-egress pipes of the first group convey data units towards egress queues scheduled below expectation, virtual ingress-to-egress pipes of the second group convey data units towards egress queues scheduled at or above expectation.

Next, an aggregated bandwidth from that input termination module towards that output termination module is determined and negotiated for each of these 2 groups separately. The system bandwidth is granted first and foremost to the first groups.

By giving precedence in the bandwidth allocation process to virtual ingress-to-egress pipes connecting ingress queues to egress queues scheduled below expectation, more data units from those ingress queues enters the switch core fabric and reach those egress queues. The internal bandwidth being upper bound, this precedence might be at the expense of virtual ingress-to-egress pipes connecting ingress queues to egress queues scheduled at or above expectation.

A distributed implementation of the bandwidth distribution means can be thought of, with bandwidth request means distributed over every input termination module, and bandwidth grant means distributed over every output termination module.

The bandwidth request means is adapted to request for said first group of virtual ingress-to-egress pipes, respectively for said second group of virtual ingress-to-egress pipes, a first fraction, respectively a second fraction, of a total ingress bandwidth available at said input termination module.

The bandwidth grant means is coupled to said bandwidth request means and is adapted, upon request of said first fraction, respectively of said second fraction, to grant to said first group of virtual ingress-to-egress pipes, respectively to said second group of virtual ingress-to-egress pipes, a third fraction, respectively a fourth fraction, of a total egress bandwidth available at said output termination module, in proportion to said first fraction, respectively to said second fraction, said total egress bandwidth being granted with precedence to said first group of virtual ingress-to-egress pipes.

It is to be noticed that the number of bandwidth requests and grants is multiplied by a factor 2, irrespective of the number of CoSs implemented, making this embodiment highly scalable.

In still an alternative embodiment of the present invention, said input termination module further comprises, as forming part of said flow controller, a stamping means coupled to said measurement means and to said ingress queue, and adapted, if said egress queue is scheduled below expectation during said first pre-determined period of time, to stamp data units from said ingress queue with an higher priority during said second pre-determined period of time, thereby giving them higher precedence for transmission through said at least point-to-point transmission means.

This embodiment addresses switch core fabrics with e.g. low-priority and high-priority traffic differentiation.

By giving precedence in the forwarding process to data units bound to an egress queue scheduled below expectation, more data units pass through congestion points, if any, and reach that egress queue.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF SUMMARY OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

The switching unit SU comprises the following functional blocks:
 a switch core fabric SW (see FIGS. 1, 2 and 3),
 M output termination modules O1 to OM (see FIGS. 1, 2 and 3), M being a non-null positive integer,
 N input termination modules I1 to IN (see FIGS. 1, 2 and 3), N being a non-null positive integer.

The output termination modules O1 to OM are coupled to egress access ports of the switch core fabric SW. The input termination modules I1 to IN are coupled to ingress access ports of the switch core fabric SW.

The switching unit SU implements C differentiated CoSs CoS1 to CoSC, C being a non-null positive integer.

The switch core fabric SW is a Multi-Path Self Routing (MPSR) switch, adapted to forward fixed length packets from any ingress access port to any egress access port. This is achieved by appending internal routing data to the transiting packets.

Figure 1:
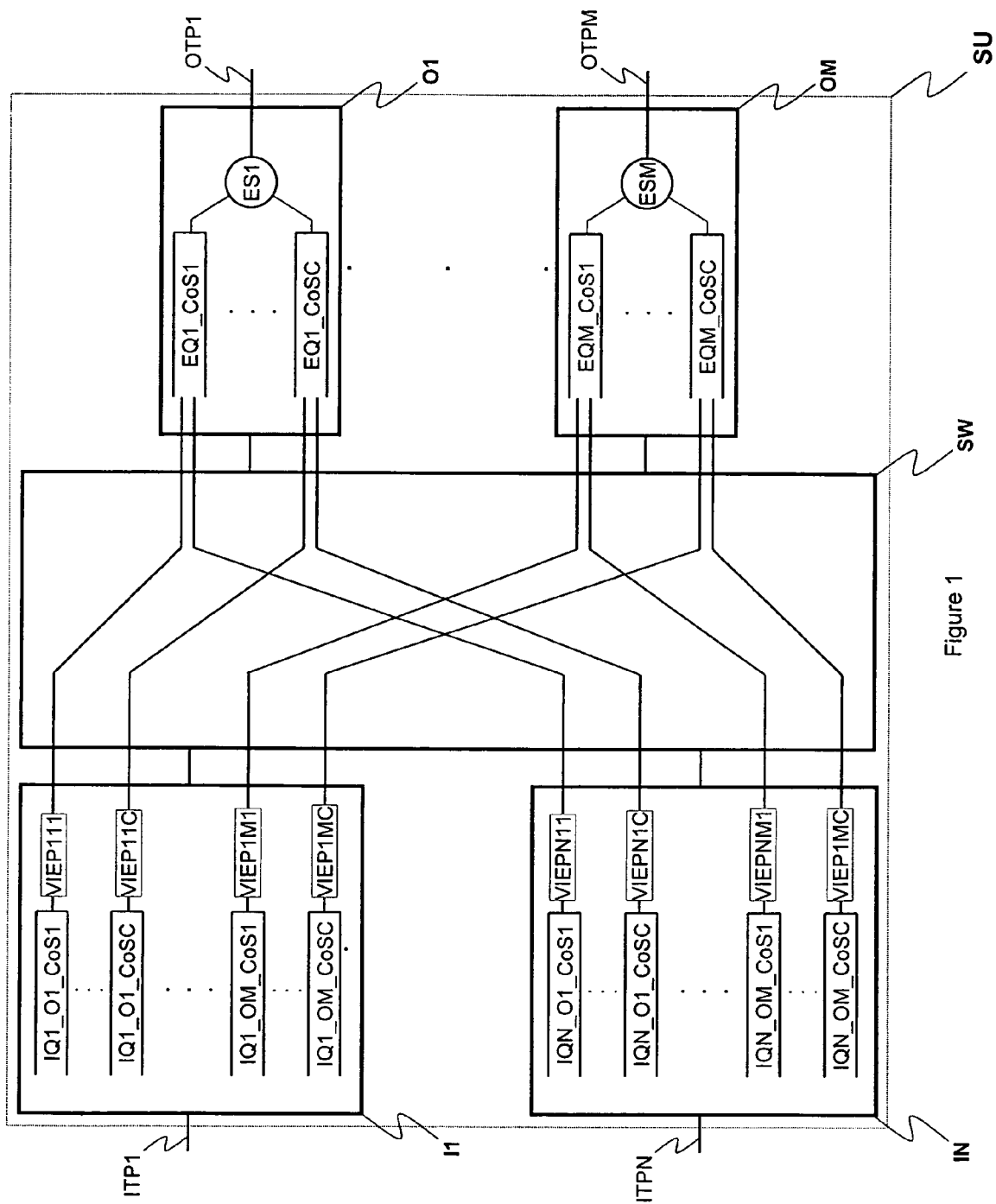
FIG. 1 represents a switching unit SU according to the prior art.
Figure 2:
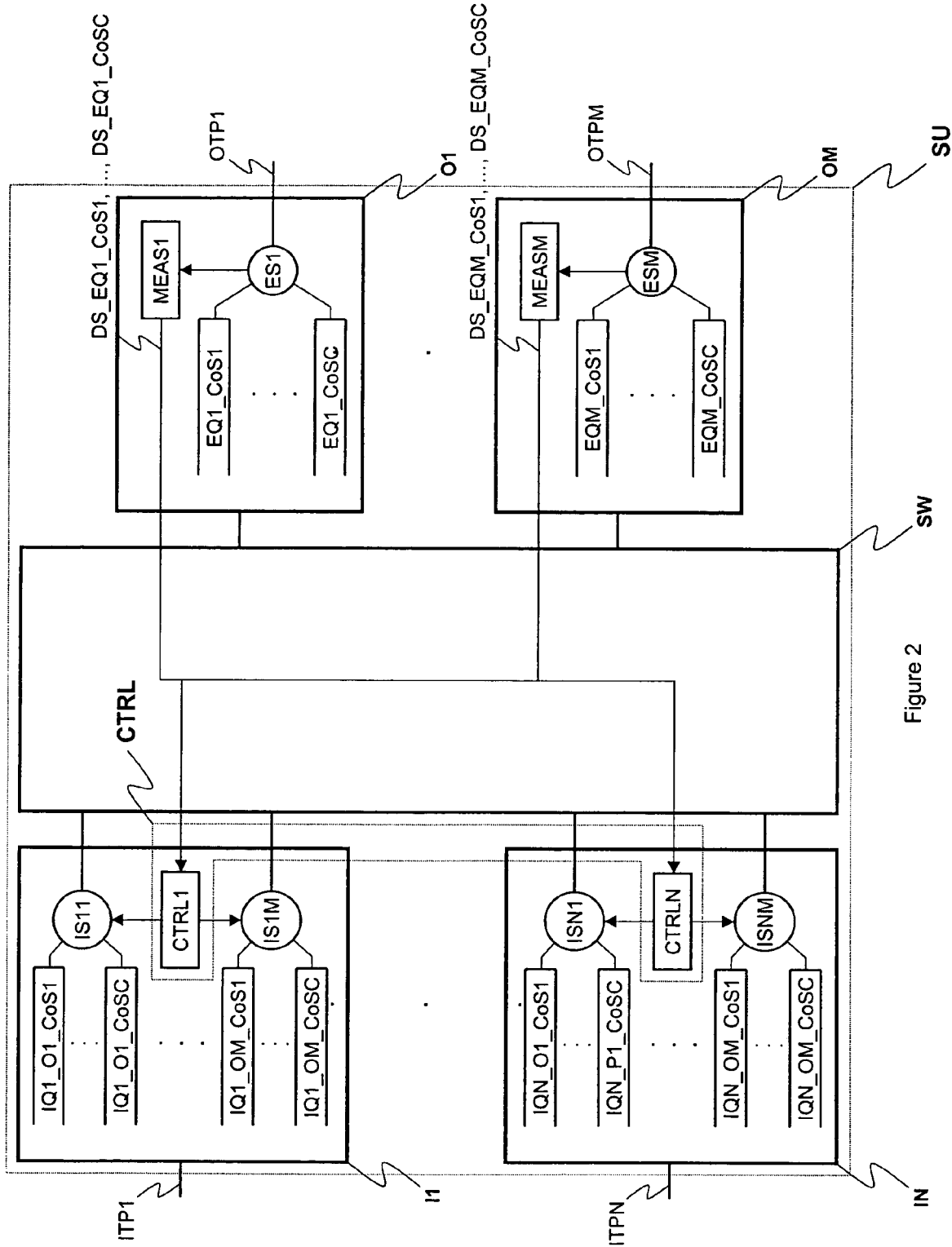
FIG. 2 represents the same switching unit implementing an ingress scheduler controller according to the present invention.
Figure 3:
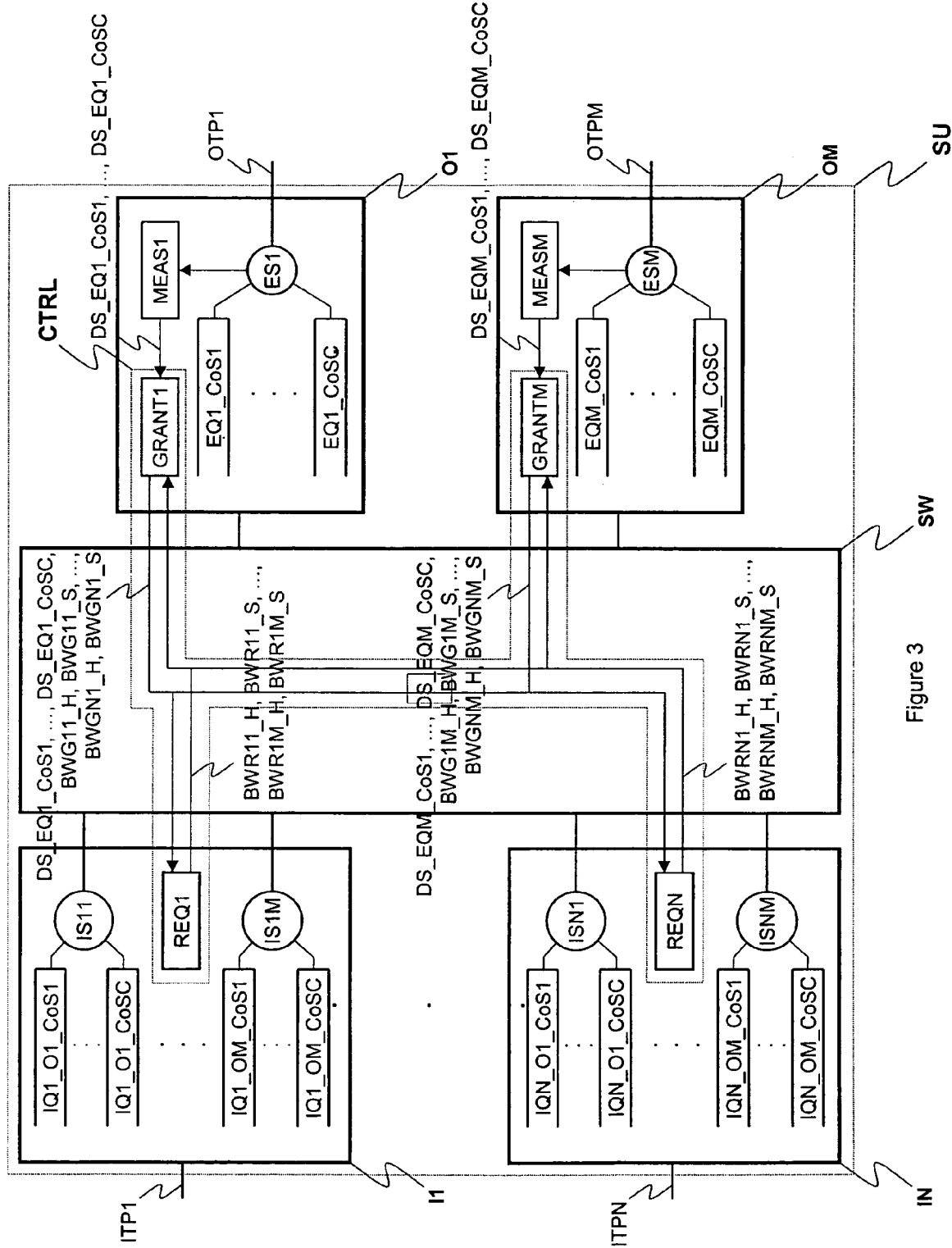
FIG. 3 represents the same switching unit implementing a bandwidth distribution means according to the present invention.

The output termination module Om, m being an index ranging from 1 to M, comprises the following functional blocks:
 an output termination port OTPm (see FIGS. 1, 2 and 3),
 C egress queues EQm_CoS1 to EQm_CoSC (see FIGS. 1, 2 and 3),
 an egress scheduler ESm (see FIGS. 1, 2 and 3),
 a measurement means MEASm (see FIGS. 2 and 3),
 a bandwidth grant means GRANTm coupled to the measurements means MEASm (see FIG. 3).

The egress scheduler ESm is coupled to the output termination port OTPm and to the egress queues EQm_CoS1 to EQm_CoSC. The measurement means MEASm is coupled to the egress scheduler ESm. The bandwidth grant means GRANTm is coupled to the measurements means MEASm.

The input termination module In, n being an index ranging from 1 to N, comprises the following functional blocks:
 an input termination port ITPn (see FIGS. 1, 2 and 3),
 C×M ingress queues IQn_O1_CoS1 to IQn_OM_CoSC (see FIGS. 1, 2 and 3),
 M ingress schedulers ISn1 to ISnM (see FIGS. 2 and 3),
 a bandwidth request means REQn (see FIG. 3),
 an ingress scheduler controller CTRLn (see FIG. 2).

The ingress schedulers ISnm is coupled to the C ingress queues IQn_Om_COS1 to IQ_Om_CoSC. The bandwidth request means REQn is externally coupled to the bandwidth grant means GRANT1 to GRANTM and to the measurements means MEAS1 to MEASM. The ingress scheduler controller CTRLn is coupled to the ingress schedulers ISn1 to ISnM, and is externally coupled to the bandwidth grant means GRANT1 to GRANTM (coupling not shown) and to the measurements means MEAS1 to MEASM.

The output termination port OTPm is adapted to originate an electrical or optical signal towards a peer switching unit, such as a Gigabit Ethernet signal, and to encode outgoing data units in a format suitable for their transmission towards the peer switching unit.

The input termination port In is adapted to terminate an electrical or optical signal from a peer switching unit, and to decode incoming data units in a format suitable for their processing within the switching unit SU.

The egress queues EQm_CoS1 to EQm_CoSC are First-In First-Out (FIFO) queues adapted to backlog outgoing data units belonging to respective ones of the CoSs CoS1 to COSC.

The ingress queues IQn_O1_CoS1 to IQn_OM_CoSC are FIFO queues adapted to backlog incoming data units belonging to respective ones of the CoSs CoS1 to COSC, and bound to respective ones of the output termination modules O1 to OM.

The egress scheduler ESm is adapted to schedule data units from the egress queues EQm_CoS1 to EQm_CoSC towards the output termination port OTPm in proportion to their respective service share.

The ingress schedulers ISnm is adapted to schedule data units from the ingress queues IQn_Om_CoS1 to IQn_Om_CoSC towards the switch core fabric SW in proportion to their respective service share.

In a preferred embodiment of the present invention, the egress scheduler ESm and the ingress scheduler ISnm are Weighted Fair Queuing (WFQ) work-conserving schedulers. Each queue is allotted a service share or weight: the higher the weight, the more data units are scheduled from that queue.

The output termination module Om further accommodates re-assembly means (not shown) for re-assembling fixed length data packets from the switch core fabric SW into variable length data units, at some place while transiting through the output termination module towards the output termination port.

The input termination module In further accommodates fragmenting means (not shown) for fragmenting incoming data units into fixed length data packets, at some point while transiting through the input termination module towards the switch core fabric.

The measurement means MEASm is adapted, for each of the egress queues EQm_COS1 to EQm_COSC:

to determine the number of data units that should be scheduled during a given period of time, this number being derived from the service share allotted to that egress queue, from the service rate allotted the egress scheduler ESm, and from the scheduling algorithm, presently WFQ, to count during the same period of time the number of data units the egress scheduler ESm has actually scheduled from that egress queue, to determine whether that egress queue is scheduled below expectation.

The measurement means MEASm maintains C2-state variables DS_EQm_CoS1 to DS_EQm_CoSC for respective ones of the egress queues EQm_CoS1 to EQm_CoSC (see FIGS. 2 and 3). The variables DS_EQm_CoS1 to DS_EQm_CoSC are further referred to as the draining status of the egress queues EQm_CoS1 to EQm_CoSC respectively.

In a preferred embodiment of the present invention, the draining status DS_EQm_CoSc of a particular egress queue EQm_CoSc, c being an index ranging from 1 to C, takes the value "at_or_above_expectation" (0), respectively "below_expectation" (1), if the actual schedule rate of the egress queue EQm_CoSc is higher than or equal to, respectively is lower than, 95% of the expected schedule rate of the egress queue EQm_CoSc.

The draining status DS_EQm_CoS1 to DS_EQm_CoSC are updated after each measurement cycle, and advertised to the bandwidth request means REQ1 to REQN and to the ingress scheduler controllers CTRL1 to CTRLN, along with an identifier of the measurement cycle to which they relate.

C×M virtual ingress-to-egress pipes VIEPn11 to VIEPnMC are assumed to connect the ingress queues IQn_O1_CoS1 to IQn_OM_CoSC to respective ones of the egress queues EQ1_CoS1 to EQM_CoSC (see FIG. 1).

The bandwidth request means REQn is adapted:
  to estimate for a given period of time C×M bandwidth needs BWNn11 to BWNnMC for respective ones of the virtual ingress-to-egress pipes VIEPn11 to VIEPnMC,
  to determine for the same period of time M first aggregate bandwidth requests BWRn1_H to BWRnM_H towards respective ones of the output termination modules O1 to OM, and M second aggregate bandwidth requests BWRn1_S to BWRnM_S towards respective ones of the output termination modules O1 to OM,
  to send the so-determined bandwidth requests to the appropriate output termination module, along with an identifier of the negotiation cycle to which they relate.

The bandwidth need BWNnmc of a particular virtual ingress-to-egress pipe VIEPnmc is estimated from prior measurements of the incoming traffic at the ingress queue IQn_Om_CoSc (e.g., by measuring queuing parameters, such as the queue filling level and the arrival rate).

The first aggregate bandwidth request BWRnm_H is obtained by summing up the bandwidth needs of every virtual ingress-to-egress pipe connecting an ingress queue of the input termination module In to an egress queue of the output termination module Om, the draining status of which has the value "below_expectation":

$$BWRnm\_H = \sum_{1 \le c \le C, DS\_EQm\_CoSc=1} BWNnmc$$

The second aggregate bandwidth request BWRnm_S is obtained by summing up the bandwidth needs of every virtual ingress-to-egress pipe connecting an ingress queue of the input termination module In to an egress queue of the output termination module Om, the draining status of which has the value "at or above_expectation":

$$BWRnm\_S = \sum_{1 \le c \le C, DS\_EQm\_CoSc=0} BWNnmc$$

Let BWTIn denote a total ingress bandwidth available at the input termination module In.

In a preferred embodiment of the present invention, BWTIn is determined as being the total bandwidth available at the ingress access port via which the input termination module In is coupled to the switch core fabric SW.

If the sum $\sum_{m=1}^{M}(BWRnm\_H + BWRnm\_S)$ exceeds $BWTIn$, then the bandwidth request means REQn determines new aggregate bandwidth requests as follows:

If $\sum_{m=1}^{M} BWRnm\_H < BWTIn$ then $BWRnm\_H' =$ $BWRnm\_H$ (unchanged) and $BWRnm\_S' =$ $$\frac{BWRnm\_S}{\sum_{m=1}^{M} BWRnm\_S} \times \left(BWTIn - \sum_{m=1}^{M} BWRnm\_H\right),$$

satisfying the relation $\sum_{m=1}^{M}(BWRnm\_H' + BWRnm\_S') = BWTIn.$

If $\sum_{m=1}^{M} BWRnm\_H \ge BWTIn$ then $BWRnm\_H' =$ $$\frac{BWRnm\_H}{\sum_{m=1}^{M} BWRnm\_H} \times BWTIn \text{ and } BWRnm\_S' = 0,$$

satisfying the relation $\sum_{m=1}^{M} BWRnm\_H' = BWTIn$

The bandwidth grant means GRANTm is adapted:
  to backlog the bandwidth requests BWR1m_H to BWRNm_H, and BWR1m_S to BWRNm_S, originating from respective ones of the bandwidth request means REQ1 to REQN, and related to the same negotiation cycle,
  to determine N first bandwidth grants BWG1m_H to BWGNm_H, and N second bandwidth grants BWG1m_S to BWGNm_S,
  to send the so-determined bandwidth grants to the appropriate input termination modules, along with an identifier of the negotiation cycle to which they relate.

Let BWTEn denote a total egress bandwidth available at the output termination module Om.

In a preferred embodiment of the present invention, BWTEm is determined as being the total bandwidth available at the egress access port via which the output termination module Om is coupled to the switch core fabric SW.

The bandwidth grant means GRANTm grants bandwidth as follows:

The bandwidth requests BWR1m_H to BWRNm_H are first fulfilled:

If $\sum_{n=1}^{N} BWRnm\_H \leq BWTEm$ then $BWGnm\_H = BWRnm\_H$, satisfying the relation $\sum_{n=1}^{N} BWGnm\_H \leq BWTEm$.

If $\sum_{n=1}^{N} BWRnm\_H > BWTEm$ then $BWGnm\_H =$ $$\frac{BWRnm\_H}{\sum_{n=1}^{N} BWRnm\_H} \times BWTEm \leq BWRnm\_H,$$

satisfying the relation $\sum_{n=1}^{N} BWGnm\_H = BWTEm$.

The bandwidth requests BWR1m_S to BWRNm_S are next fulfilled with the remaining bandwidth $$BWTEm - \sum_{n=1}^{N} BWGnm\_H,$$

if any:

If $\sum_{n=1}^{N} BWRnm\_S \leq BWTEm - \sum_{n=1}^{N} BWGnm\_H$ then $BWGnm\_S =$ $BWRnm\_S$, satisfying the relation $\sum_{n=1}^{N} (BWGnm\_H + BWGnm\_S) \leq BWTEm$.

If $\sum_{n=1}^{N} BWRnm\_S > BWTEm - \sum_{n=1}^{N} BWGnm\_H$ then $BWGnm\_S =$ $$\frac{BWRnm\_S}{\sum_{n=1}^{N} BWRnm\_S} \times \left( BWTEm - \sum_{n=1}^{N} BWGnm\_H \right) \leq BWRnm\_S,$$

satisfying the relation $\sum_{n=1}^{N} (BWGnm\_H + BWGnm\_S) = BWTEm$.

The ingress scheduler controller CTRLn is adapted to determine during a given period of time, and to put in force during the next period of time, the service rates SRn1 to SRnM of the ingress schedulers ISN1 to ISnM respectively.

The service rate SRnm of the scheduler ISnm is determined as follows:

SRnm=BWGnm_S+BWGnm_H, satisfying the relation $$\sum_{m=1}^{M} SRnm \leq BWTIn$$

The ingress scheduler controller CTRLn is further adapted to determine for a given period of time, and to put in force during the next period of time, the service shares SSn11 to SSnMC of the ingress queues IQn_O1_CoS1 to IQn_OM_CoSC.

The service share SSnmc of a particular ingress queue IQn_Om_CoSc is determined from the priority allotted to the CoS CoSc, and is weighted by the draining status of the egress queue EQm_CoSc as advertised by the measurement means MEASm.

Let $\Phi nmc$ denote the initial service share allotted to the ingress queue IQn_Om_CoSc.

The initial service share is then increased by a pre-determined scaling factor K1 if the draining status DS_EQm_CoSc has the value "below_expectation", and decreased by a predetermined scaling factor K2 if the draining status DS_EQm_CoSc has the value "at_or_above_expectation":

If $DS\_EQm\_CoSc=1$ then $SSnmc=K1 \times \Phi nmc$, with $K1>1$.

If $DS\_EQm\_CoSc=0$ then $SSnmc=K2 \times \Phi nmc$, with $K2 \leq 1$.

In a preferred embodiment of the present invention, K1=8 and K2=1.

An operation of this embodiment follows. The period of time during which the actual schedule rate of the egress queue is measured, the period of time during which bandwidth requests and grants are determined and agreed on, and the period of time during which the service rate and service share are in forced are subsequent to one another, contiguous, and of an equal duration T. Value for T are typically between 250 μs and 600 μs. For convenience, periods are indexed from 0 onwards, and each of the foregoing parameters is subscripted with the index of the period during which, or upon completion of which, it is determined.

Initially (period index=−1), all the parameters are reset to 0: for all m, n and c, $DS\_EQm\_CoSc_{-1}=0$, $BWNnmc_{-1}=0$, $BWRnm\_H_{-1}=0$, $BWRnm\_S_{-1}=0$, $BWGnm\_H_{-1}=0$, $BWGnm\_S_{-1}=0$, $SRnm_{-1}=0$ and $SSnmc_{-1}=0$.

Upon completion of period t, t being an index ranging from 0 onwards, the measurement means MEAS1 to MEASM determine the draining status of all the egress queues, thereby determining $DS\_Eqm\_CoSc_t$. During the same period, the bandwidth request means REQ1 to REQN measure the incoming traffic at every ingress queue, thereby determining $BWNnmc_t$.

During period t+1, the measurement means MEAS1 to MEASM advertises $DS\_EQm\_CoSc_t$ to the bandwidth request means REQ1 to REQN and to the ingress scheduler controller CTRL1 to CTRLN. Next but still during the same period, the bandwidth request means REQ1 to REQN determine $BWRnm\_H_{t+1}$ and $BWRnm\_S_{t+1}$ from $BWNnmc_t$ and $DS\_EQm\_CoSc_t$. Next but still during the same period, the bandwidth grant means GRANT1 to GRANTM determine $BWGnm\_H_{t+1}$ and $BWGnm\_S_{t+1}$ from $BWRnm\_H_{t+1}$ and $BWRnm\_S_{t+1}$. Next but still during the same period, the ingress scheduler controllers CTRL1 to CTRLN determine $SRnm_{t+1}$ from $BWGnm\_H_{t+1}$ and $BWGnm\_S_{t+1}$, and $SSnmc_{t+1}$ from $\Phi nmc$ and $DS\_EQm\_CoSc_t$.

During period t+2, the ingress schedulers CTRL1 to CTRLN put the service rates $SRnm_{t+1}$ and the service shares $SSnmc_{t+1}$ in force in the ingress schedulers, thereby achieving the object of the present invention.

In an alternative embodiment of the present invention (not shown), the switch core fabric SW gives precedence to data units stamped as high-priority traffic over data units stamped as low-priority traffic. The switch core fabric SW further implements 2 distinct back-pressure signals for low and high priority traffic.

The input termination module In further accommodates a stamping means STMPn coupled to the ingress schedulers ISn1 to ISnM and to the switch core fabric SW, and externally coupled to the measurement means MEAS1 to MEASM.

The stamping means STMPn is adapted to stamp fixed length packets bound to egress queues, the draining status of which has the value "below_expectation", as high-priority traffic, and to stamp fixed length packets bound to egress queues, the draining status of which has the value "at_or_above_expectation", as low-priority traffic, thereby achieving the object of the present invention.

In still an alternative embodiment of the present invention (not shown), the draining status is a 3 state variable, the values of which are "at_or_above_expectation" (0), "below_expectation" (1) and "very_below_expectation" (2).

The measurement means MEASm makes use of 2 thresholds when comparing the actual schedule rate against the expected schedule rate (e.g. 95% and 50% of the expected schedule rate).

The bandwidth request means REQn determines first, second and third aggregate bandwidth requests for each draining status value. The bandwidth grant means GRANTm grants bandwidth by giving precedence to the first, next second, next third bandwidth requests.

The ingress schedulers CTRLn adjusts the service shares of the ingress queues by making use of three scaling factors.

In still an alternative embodiment of the present invention, the bandwidth request means REQ1 to REQN, and/or the bandwidth grant/means GRANT1 to GRANTM, and/or the ingress scheduler controllers CTRL1 to CTRLN are partly/wholly centrally implemented.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A switching unit comprising:
a switch core fabric,
an output termination module (Om, $1 \leq m \leq M$) coupled to said switch core fabric,
an input termination module (In, $1 \leq n \leq N$) coupled to said switch core fabric,
said output termination module comprising:
an egress queue (EQm_CoSc, $1 \leq c \leq C$) adapted to backlog data units belonging to a class of service (CoSc),
an egress scheduler coupled to said egress queue, and adapted to schedule data units from said egress queue towards an output termination port, said input termination module comprising:
an ingress queue adapted to backlog data units belonging to said class of service and bound to said output termination module,
said switching unit further comprising, as forming part of said input termination module, of said switch core fabric and of said output termination module, at least point-to-point transmission means adapted to convey data units from at least said ingress queue to at least said egress queue, said at least point-to-point transmission means being considered, with respect to said ingress queue and to said egress queue, as a virtual ingress-to-egress pipe connecting said ingress queue to said egress queue,
wherein said output termination module further comprises a measurement means coupled to said egress scheduler, and adapted to determine whether said egress queue is scheduled below expectation during a first pre-determined period of time by comparing an actual scheduled data rate to an expected scheduled data rate which is based at least on a service share allotted to a respective egress queue,
and said switching unit further comprises a flow controller coupled to said measurement means, which flow controller increases bandwidth of the virtual ingress-to-egress pipe during a second pre-determined period of time subsequent to the first pre-determined period of time, if said egress queue is determined to be scheduled below expectation during said first pre-determined period of time.

2. The switching unit according to claim 1, wherein said input termination module further comprises, as forming part of said virtual ingress-to-egress pipe, an ingress scheduler adapted to schedule said incoming data units from said ingress queue towards said switch core fabric in proportion to a service share allotted to said ingress queue,
and wherein said flow controller comprises an ingress scheduler controller coupled to said measurement means and to said ingress scheduler, and adapted, if said egress queue is scheduled below expectation during said first pre-determined period of time, to allot an higher service share to said ingress queue during said second pre-determined period of time.

3. The switching unit according to claim 1, wherein said flow controller comprises a bandwidth distribution means coupled to said measurement means, and adapted:
to assign said virtual ingress-to-egress pipe to either a first group of virtual ingress-to-egress pipes or a second group of virtual ingress-to-egress pipes, depending on whether said egress queue is scheduled below expectation during said first pre-determined period of time, each of said first group of virtual ingress-to-egress pipes connecting an ingress queue of said input termination module to an egress queue of said output termination module scheduled below expectation during said first pre-determined period of time, each of said second group of virtual ingress-to-egress pipes connecting an ingress queue of said input termination module to an egress queue of said output termination module scheduled at or above expectation during said first pre-determined period of time,
to distribute to said first group of virtual ingress-to-egress pipes, respectively to said second group of virtual ingress-to-egress pipes, a first amount of a total bandwidth and a second amount of a total bandwidth available through said at least point-to-point transmission means, said total bandwidth being distributed with precedence to said first group of virtual ingress-to-egress pipes.

4. The switching unit according to claim 3, wherein said input termination module further comprises, as forming part of said bandwidth distribution means, a bandwidth request means adapted to request for said first group of virtual ingress-to-egress pipes, respectively for said second group of virtual ingress-to-egress pipes, a first fraction (BWRnm_H), respectively a second fraction (BWRnm_S), of a total ingress bandwidth available at said input termination module, and wherein said output termination module further comprises, as forming part of said bandwidth distribution means, a bandwidth grant means coupled to said bandwidth request means, and adapted, upon request of said first fraction, respectively of said second fraction, to grant to said first group of virtual ingress-to-egress pipes, respectively to said second group of virtual ingress-to-egress pipes, a third fraction (BWGnm_H), respectively a fourth fraction (BWGnm_S), of a total egress bandwidth available at said output termination module, in proportion to said first fraction, respectively to said second fraction, said total egress bandwidth being granted with precedence to said first group of virtual ingress-to-egress pipes.

5. The switching unit according to claim 1, wherein said input termination module further comprises, as forming part of said flow controller, a stamping means coupled to said measurement means and to said ingress queue, and adapted, if said egress queue is scheduled below expectation during said first pre-determined period of time, to stamp data units from said ingress queue with a higher priority during said second pre-determined period of time, thereby giving them higher precedence for transmission through said at least point-to-point transmission means.

6. The switching unit according to claim 1, wherein the measurement means:
- determines an expected number of data units that is to be scheduled according to the expected schedule rate during a given period of time,
- counts an actual number of data units that are actually scheduled during the same period of time in each egress queue, and
- compares the expected number of data units to the actual number of data units to determine whether that egress queue is scheduled below expectation.

* * * * *